United States Patent
Morrison et al.

(10) Patent No.: US 12,190,398 B2
(45) Date of Patent: Jan. 7, 2025

(54) SYSTEMS AND METHODS FOR FACILITATING A REVERSE-ENTRY PROCESS

(71) Applicant: EAB Global, Inc., Washington, DC (US)

(72) Inventors: Joseph Derek Morrison, Brooklyn, NY (US); Richard Harvey Winslow, Jr., Glen Ridge, NJ (US)

(73) Assignee: EAB Global, Inc., Washington, DC (US)

( * ) Notice: Subject to any disclaimer, the term of this patent is extended or adjusted under 35 U.S.C. 154(b) by 51 days.

(21) Appl. No.: 18/057,718

(22) Filed: Nov. 21, 2022

(65) Prior Publication Data

US 2024/0171646 A1    May 23, 2024

Related U.S. Application Data

(63) Continuation of application No. 17/032,086, filed on Sep. 25, 2020, now abandoned.

(51) Int. Cl.
*G06F 15/16* (2006.01)
*G06F 16/28* (2019.01)
(Continued)

(52) U.S. Cl.
CPC ....... *G06Q 50/2053* (2013.01); *G06F 16/288* (2019.01); *G06F 16/9535* (2019.01);
(Continued)

(58) Field of Classification Search
CPC .............................. H04L 67/306; G06F 16/288
(Continued)

(56) References Cited

U.S. PATENT DOCUMENTS

2010/0070492 A1   3/2010  Dattatri
2012/0330708 A1*  12/2012  Khan ................ G06Q 10/06
                                                    705/7.14
(Continued)

OTHER PUBLICATIONS

Cortes et al. Match or Mismatch? Automatic Admissions and College Preferences of Low-and High-Income Students. Dec. 3, 2018 (Dec. 3, 2018). pp. 98-123.
(Continued)

*Primary Examiner* — Alan S Chou
(74) *Attorney, Agent, or Firm* — Bookoff McAndrews, PLLC

(57) ABSTRACT

A computer implemented method for administration of admission offers from educational institutions including receiving student information from students, generating a unique student identifier for each of the students, generating a universal student profile for each of the students on the database, the universal student profile including the unique student identifier, student identification information, and student qualification information for each of the students, identifying matching students from a plurality of universal student profiles stored on the database whose qualification information satisfies the entrance requirement information of any of the plurality of educational institution profiles stored on the database, generating on the database an anonymized version of the universal student profile of each of the matching students, and transmitting over the data network the anonymized version of the universal student profile of each of the matching students to educational institutions whose entrance requirements have been satisfied by the matching students.

17 Claims, 7 Drawing Sheets

(51) Int. Cl.
  *G06F 16/9535* (2019.01)
  *G06F 21/62* (2013.01)
  *G06Q 10/0631* (2023.01)
  *G06Q 10/10* (2023.01)
  *G06Q 30/018* (2023.01)
  *G06Q 50/20* (2012.01)
  *H04L 67/306* (2022.01)

(52) U.S. Cl.
  CPC ... *G06F 21/6254* (2013.01); *G06Q 10/06311* (2013.01); *G06Q 10/10* (2013.01); *G06Q 30/0185* (2013.01); *H04L 67/306* (2013.01)

(58) Field of Classification Search
  USPC .......................................................... 709/219
  See application file for complete search history.

(56) References Cited

U.S. PATENT DOCUMENTS

| | | | |
|---|---|---|---|
| 2013/0031016 A1* | 1/2013 | Rubinstein | G06Q 10/0635 705/321 |
| 2013/0110640 A1 | 5/2013 | Powell et al. | |
| 2013/0311390 A1 | 11/2013 | Hickey et al. | |
| 2014/0279644 A1* | 9/2014 | McCrory | G06Q 50/2053 705/327 |
| 2015/0227892 A1* | 8/2015 | Goel | G06Q 10/1053 705/321 |
| 2016/0117790 A1 | 4/2016 | Falk | |
| 2017/0140488 A1 | 5/2017 | Caines et al. | |
| 2018/0032960 A1* | 2/2018 | Pannagl, Jr. | G06Q 10/1053 |
| 2018/0307750 A1* | 10/2018 | Gupta | G06F 16/9535 |
| 2019/0034843 A1 | 1/2019 | Mehrotra | |
| 2019/0385112 A1 | 12/2019 | Copeland | |
| 2020/0007336 A1* | 1/2020 | Wengel | G06F 16/1824 |

OTHER PUBLICATIONS

Machado et al. Centralized Admission and the Student-College Match. Sep. 30, 2016 (Sep. 30, 2016). 52 pages.

* cited by examiner

SYSTEMS AND METHODS FOR FACILITATING A REVERSE-ENTRY PROCESS

RELATED APPLICATIONS

This application is a continuation of and claims the benefit of priority to U.S. application Ser. No. 17/032,086, entitled "METHOD AND SYSTEM FOR ADMINISTRATION OF ADMISSION OFFERS FROM EDUCATIONAL INSTITUTIONS," filed Sep. 25, 2020, the entirety of which is incorporated herein by reference.

FIELD

This application relates to a method and system for administration of admission offers from educational institutions and, more specifically, to administration of admission offers from educational institutions to anonymized students who have not applied directly to the educational intuitions.

BACKGROUND

There are over 25,000 educational institutions in the World, collectively offering hundreds or thousands of programs of study. Students looking to higher education have are enormous range of possible choices, limited only by their academic performance, budget, ability to travel, and other constraints. In practice, there are too many choices for most students and families to understand and navigate. As a result, most students around the world typically choose their higher education from among a small set of institutions that are geographically nearby, or that they have heard of from a friend, advisor, or advertisement. It follows that many students fail to consider a vast majority of higher education options and, as a result, miss the opportunity to develop their full potential.

In addition to there being too many choices and too little information, students must apply to each of their chosen institutions using processes that are tedious and stressful. Educational institutions may each have different application requirements, processes, and deadlines, and the outcomes are unpredictable. Students must often wait weeks or months to determine whether their applications have been accepted, and have little time to react if they are denied entry to their top choices. Some students inadvertently apply to educational institutions beyond their academic reach and end up with no admission offers. Others fail to take advantage of advanced application techniques such as Early Decision, with the result that many seats at the best institutions go to more privileged students who can afford to hire college counselors to help them navigate the system more skillfully. The complexity of the process and information asymmetry often lead to suboptimal, unfair outcomes for students, at a deplorable cost in global human capital.

What is needed is a solution that enables educational institutions to discover well matched students anywhere in the world and admit them proactively, thereby reducing the need for students to research, select, and apply to educational institutions.

SUMMARY

A computer implemented method for administration of admission offers from educational institutions is disclosed. The computer implemented method comprising providing a plurality of educational institution profiles stored on and individually retrievable from a database, each of the plurality of educational institution profiles including a unique educational institution identifier and entrance requirement information for an educational institution, providing a plurality of certifier profiles stored on and individually retrievable from the database, each of the certifier profiles including a unique certifier identifier and certifier identification information, receiving student information from students on student input devices over a data network, the student information including student identification information and student qualification information for a student, generating a unique student identifier for each of the students, generating a universal student profile for each of the students on the database, the universal student profile including the unique student identifier, the student identification information, and the student qualification information for each of the students, identifying matching students from a plurality of universal student profiles stored on the database whose qualification information satisfies the entrance requirement information of any of the plurality of educational institution profiles stored on the database, generating on the database an anonymized version of the universal student profile of each of the matching students, and transmitting over the data network the anonymized version of the universal student profile of each of the matching students to educational institution input devices over the data network of educational institutions whose entrance requirements have been satisfied by the matching students.

A system for administration of admission offers from educational institutions is disclosed. The system comprising a plurality of student input devices, the plurality of student input devices accessed by students seeking admission offers from educational institutions, a plurality of educational institution input devices, the plurality of educational institution input devices accessed by educational institutions seeking to provide admission offers to the students, a plurality of certifier input devices, the plurality of certifier input devices accessed by certifiers seeking to provide certification of the students, an administrative server providing for administration of admission offers from the educational institutions, a data network interconnecting the plurality of student input devices, the plurality of educational institution input devices, the plurality of certifier input devices, and the administrative server, and a database in communication with the administrative server, the database comprised of a student schema for data on the students, an educational institution schema for data on the educational institutions, a certifier schema for data on the certifiers, and a certification notice schema for data on certification notices.

BRIEF DESCRIPTION OF THE DRAWINGS

The drawings, described below, are for illustrative purposes only and are not necessarily drawn to scale. The drawings are not intended to limit the scope of the disclosure in any way. Wherever possible, the same or like reference numbers are used throughout the drawings to refer to the same or like parts.

DETAILED DESCRIPTION

As mentioned above, this application relates to a method and system for administration of admission offers from educational institutions and, more specifically, to the administration of admission offers from educational institutions to anonymized students that have not applied directly to the educational intuitions.

The present application describes a system and method in which students do not need to send applications to specific universities, but instead, publish universal student profiles in such a manner that any higher education institution, anywhere in the world, can discover them, assess their profiles, and make admission offers, with no applications required. The effect is to shift the work of matching students and university programs to the universities, who have the best understanding of their programs and entry requirements, and are therefore more qualified than students to determine suitable matches. Students no longer need to agonize over which university programs might be best, apply, and hope for admission. Instead, they can publish a profile that puts their best foot forward, assess university admission offers as they come in, and choose whichever offer they like best. The investment of effort is dramatically reduced since the students need only complete one profile instead of sending many applications, there is no application process to navigate, and students can discover academic programs that they might never have known about since the universities discover them, rather than the other way around. The resulting system and method are simpler, fairer, and less stressful for students. It will increase global access to higher education by connecting students to education opportunities on a larger scale and removing barriers.

The key challenges in building such a system and method are creating trust between the parties and protecting student privacy. Universities need to trust the student information they are assessing, and students need to know that their academic and personal information are being kept private. The embodiment disclosed herein offers a solution to both challenges. Student privacy is protected through anonymization and trust between the parties is established with a system and method of certifiers and certification notices.

Figure 1:
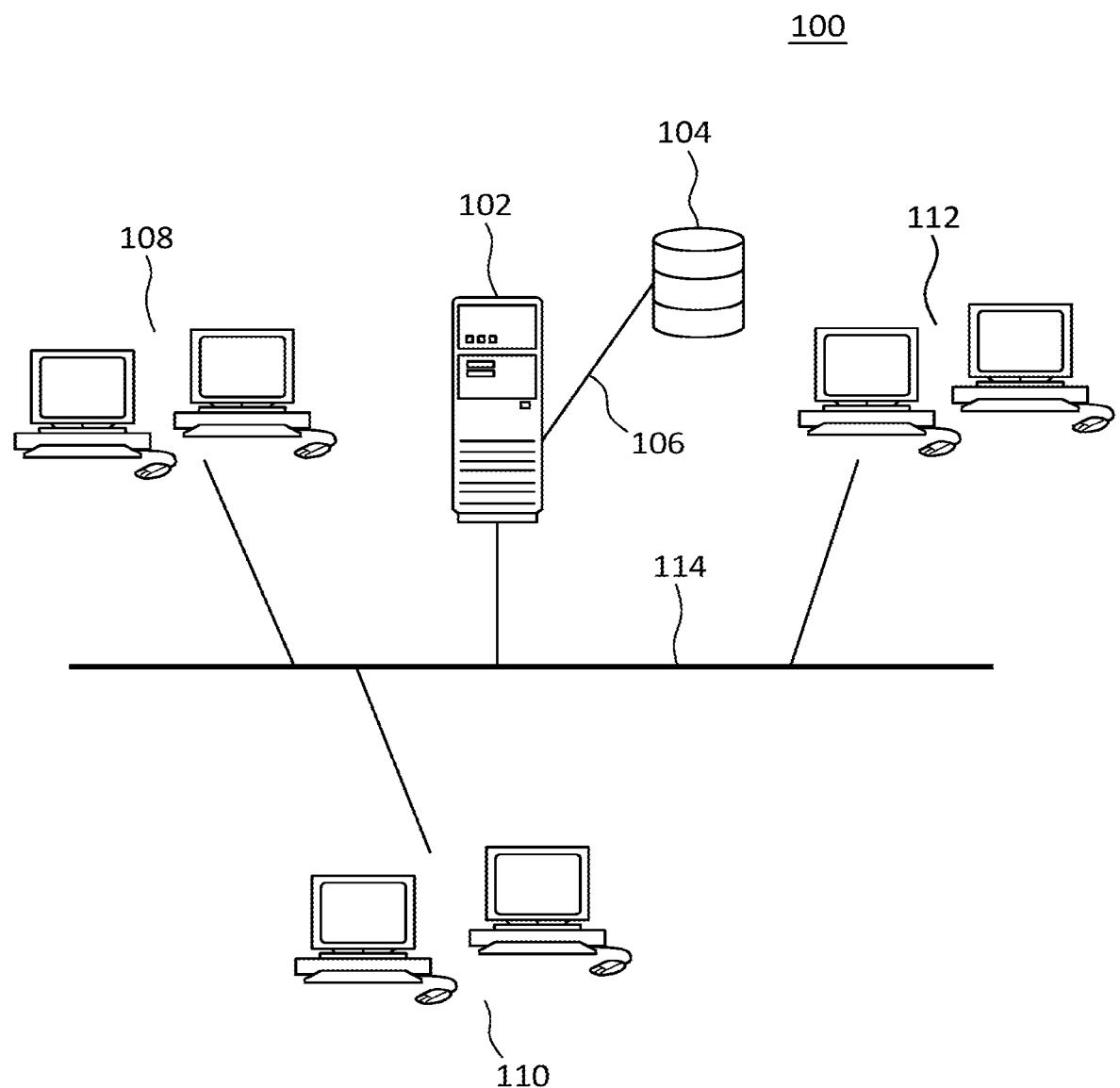
FIG. 1 is a block diagram of a system for administration of admission offers from educational institutions according to the embodiments disclosed herein.

FIG. 1 is a block diagram of a system 100 for administration of admission offers from educational institutions according to the embodiments disclosed herein. The system 100 may include an administrative server 102, a database 104, a plurality of student input devices 108, a plurality of educational institution input devices 112, a plurality of certifier input devices 110, and a data network 114.

The administrative server 102 executes a number of internal software processes that contribute to the implementation of the claimed method for administration of admission offers from educational institutions. The software processes may include, but are not limited to, server software programs, cloud software programs, web-based software applications or browsers embodied as websites, web applications, desktop applications, and mobile applications compatible with a corresponding personal computer. The software processes may store and access data in either internal or external databases or both.

The administrative server 102 may include one or more computer systems directly connected or connected over a data network. Each of the computer systems comprising the administrative server 102 may include a processor, non-transitory memory, user input and output mechanisms, a network interface, and executable program code (software) comprising computer-executable instructions stored in non-transitory memory that are executed to control the operation of the administrative server 102.

The database 104 provides for the storage and searchable retrieval of data used in the implementation of the claimed method for administration of admission offers from educational institutions. The database 104 may include a single database, a plurality of separate databases, or both. Moreover, the database 104 may be located at a single location or multiple locations. The database 104 is accessible to the administrate server 102 over any direct communications link 106, including a local area network (LAN).

The plurality of student input devices 108, the plurality of certifier input devices 110, and the plurality of educational institution input devices 112 may be a personal computing device that allows its user to interact with the administrative server 102 and with each other over the data network 114. The personal computing device may be, but is not limited to, a smartphone, a smartwatch, a laptop computer, a desktop computer, a server computer, or a tablet.

The plurality of student input devices 108 may be accessed by students seeking admission offers from participating educational institutions. The plurality of certifier input devices 110 may be accessed by participating third-party certifiers who review and verify student information provided by the students seeking admission offers. The plurality of educational institution input devices 112 may be accessed by participating educational institutions who review student information and provide admission offers to those students deemed eligible to receive an admission offer from an educational institution.

The data network 114 provides for the plurality of student input devices 108, the plurality of certifier input devices 110, and the plurality of educational institution input devices 112 to communicate with the administrative server 102 and each other over a data network type connection.

The data network 114 may be any desired network, including the Internet. Various data network types may be implemented in accordance with the embodiments of the invention, including a wired or wireless local area network (LAN), a wide area network (WAN), and any other type of network that comprises or is connected to the Internet. When the data network 114 is implemented as a LAN network environment, computers can be connected to the LAN through a network interface or adapter. When the data network 114 is implemented as a WAN network environment, computers may connect to the WAN through modem, router, switch, or other data communication mechanism. The data network may implement a data communication protocol that may include TCP/IP, UDP, OSI, Ethernet, or any other desired data communication protocol. Computers on the data network 114 may communicate through a combination of wired and wireless paths.

Figure 2:
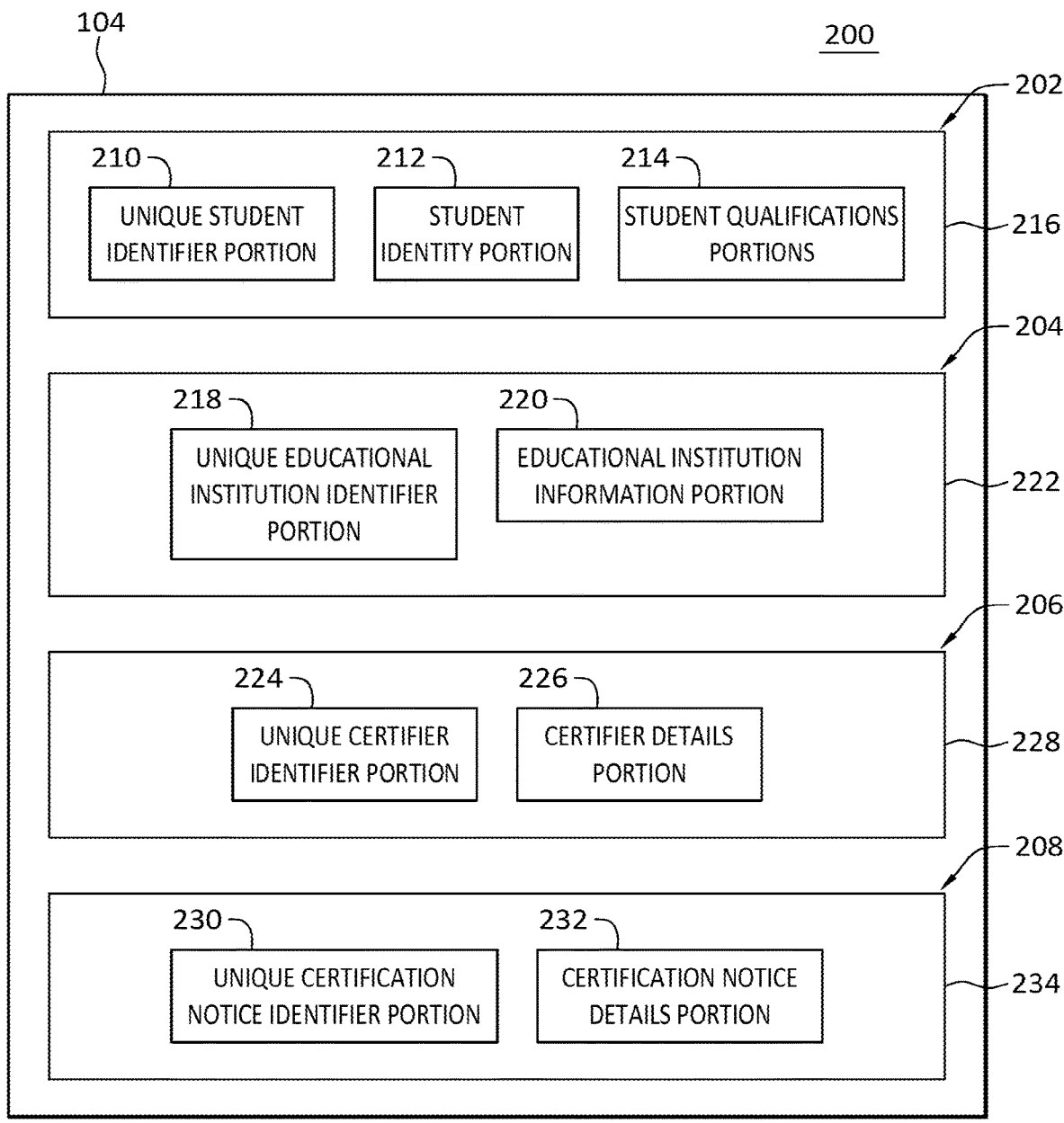
FIG. 2 is a block diagram of a database configuration implemented within the system for administration of admission offers from educational institutions according to the embodiments disclosed herein.

FIG. 2 is a block diagram of a database configuration 200 implemented within the system 100 for administration of admission offers from educational institutions according to the embodiments disclosed herein. The database configuration 200 may be implemented within the database 104 and may include a student schema 202, an educational institution schema 204, a certifier schema 206, and a certification notice schema 208.

The student schema 202 provides for the storage and searchable retrieval of data records containing student information within the database 104. The student schema 202 may include a unique student identifier portion 210, a student identity portion 212, and a student qualifications portion 214. The combination of at least the unique student identifier portion 210, the student identity portion 212, and the student qualifications portion 214 together comprise a universal student profile 216 created within the database 104 for each student.

The unique student identifier portion 210 contains a unique student identifier comprised of a sequence of characters and numbers that together function as a unique identifier for each student for which a universal student profile has been created within the database 104.

The student identity portion 212 may include student identification information that may include first and last name, date of birth, phone number, email address, and mailing address.

The student identity portion 212 may be removed from a universal student profile 216 to anonymize that particular universal student profile 216. A universal student profile 216 that has been anonymized may be referenced and de-anonymized using the unique student identifier stored in unique student identifier portion 210 of the universal student profile.

The student qualifications portion 214 contains information on a student's qualifications for admittance to an education institution. The qualifications including desired programs of study, desired start dates, academics, English language, standardized tests, budget, and source country and region.

The desired programs of study qualification defining a list of majors that a student is interested in pursuing at an educational institution.

The desired start dates qualification defining those dates that a student is willing to start a desired program of study at an educational institution.

The academics qualification documenting a student's earned academic grades.

The English language proficiency qualification documenting a student's earned English language proficiency test scores.

The standardized tests qualification documenting a student's scores on a standardized test, including scores for SAT, ACT, or any other standardized test a particular student has taken.

The budget qualification identifying what a student can afford to spend per year for a program of study at an educational institution.

Lastly, the source country and region qualification identifying a student's country or region of citizenship.

The education institution schema 204 provides for the storage and searchable retrieval of data records containing educational institution information within the database 104. The educational institution schema 204 may include a unique educational institution identifier portion 218 and an educational institution information portion 220.

The combination of at least the unique educational institution identifier portion 218 and the educational institution information portion 220 together comprise an educational institution profile 222 that is created for each educational institution within the database 104.

The unique educational institution identifier portion 218 may contain a unique education institution identifier comprised of a sequence of characters and numbers that function as a unique identifier for each education institution within the system 100 for administration of admission offers from educational institutions.

The educational institution information portion 220 may include an educational institution details section, an educational institution entrance requirements section, and a user details section.

The educational institution details section may include information on an educational institution's name, website address, logo, and correspondence address as well as an overview description of the educational institution.

The educational institution entrance requirement section including information on the requirements for entrance to an educational institution. The entrance requirements including available programs of study, available start dates, academics, English language proficiency, standardized tests, annual budget, and desired countries and regions.

The available programs of study entrance requirement defining the programs of study available at an educational institution.

The available start dates entrance requirement defining those dates when a student may begin an available program of study at an educational institution.

The academics entrance requirement identifying minimum academic grades necessary for admittance to an academic institution, the academic grades types including International Baccalaureate (IB), A levels, GPA, percentages, or any other type of academic grades recognized by a particular educational institution.

The English language proficiency entrance requirement identifying a minimum English proficiency score necessary for admittance to an academic institution. The English proficiency score based on a recognized English proficiency tests that may include TOEFL, IELTS, Duolingo English Test, or any other recognized English proficiency test.

The standardized test entrance requirement identifying minimum test scores in standardized tests, the standardized tests including SAT, ACT, or any other recognized standardized test.

The annual budget entrance requirement identifying yearly fees required to attend an educational institution, including tuition and accommodation.

Lastly, the desired source countries and regions entrance requirement identifying those countries and regions from which an educational institution is seeking to accept students.

The user details section may include information on users who are authorized to access the administrative server 102 from any one of the plurality of educational institution input devices 112. The information on a user including a user's first and last name, email address, phone number, role at the educational institution, as well as whether or not the user is authorized to make admission offers.

The certifier schema 206 provides for the retrievable storage of data records containing information on third-party certifiers within the database 104. The certifier schema 206 may include at least a unique certifier identifier portion 224 and a certifier details portion 226.

The combination of at least the unique certifier identifier portion 224 and the certifier details portion 226 together comprise a certifier profile 228 that is created for each certifier within the database 104.

The unique certifier identifier portion 224 may include a unique certifier identifier comprised of a sequence of characters and numbers that function as a unique identifier for each certifier within the system 100 for the administration of admission offers from educational institutions.

The certifier detail portion 226 may include a certifier identification section, a certifier type section, a certifier employer section, and a certifier authorization section.

The certifier identification section referencing certifier identification information, including first and last name, email address, phone number, and city and country of residence.

The certifier type section referencing certifier type information, including high school counselor, independent counselor, or education agent.

The certifier employer section referencing certifier employment information, including employer name, employment role, and professional and school affiliations.

Lastly, the certifier authorization section referencing certifier authorization information on whether or not a certifier is authorized to view or block direct communications between a student and an educational institution.

The certification notice schema 208 provides for the storage and searchable retrieval of data records containing certification notices stored within the database 104. The certification notice schema 208 may include at least a unique certification notice identifier portion 230 and a certification notice details portion 232.

The combination of at least the unique certification notice identifier portion 230 and the certification notice details portion 232 together comprises a certification notice profile 234 created for each certification notice within the database 104.

The unique certification notice identifier portion 230 may contain a unique certification notice identifier comprised of a sequence of characters and numbers that together function as a unique identifier for each certification notice stored within the database 104.

The certification notice details portion 232 may include a timestamp section, a certifier section, and a universal student profile section.

The timestamp section referencing a timestamp of when a certification notice was created.

The certifier section referencing a complete copy of a certifier profile of a certifier responsible for issuing the certification notice.

Lastly, the universal student profile section referencing a copy of an anonymized version of a universal student profile stored on the database 104, whose information has been validated by the issuance of a certification notice.

Figure 3:
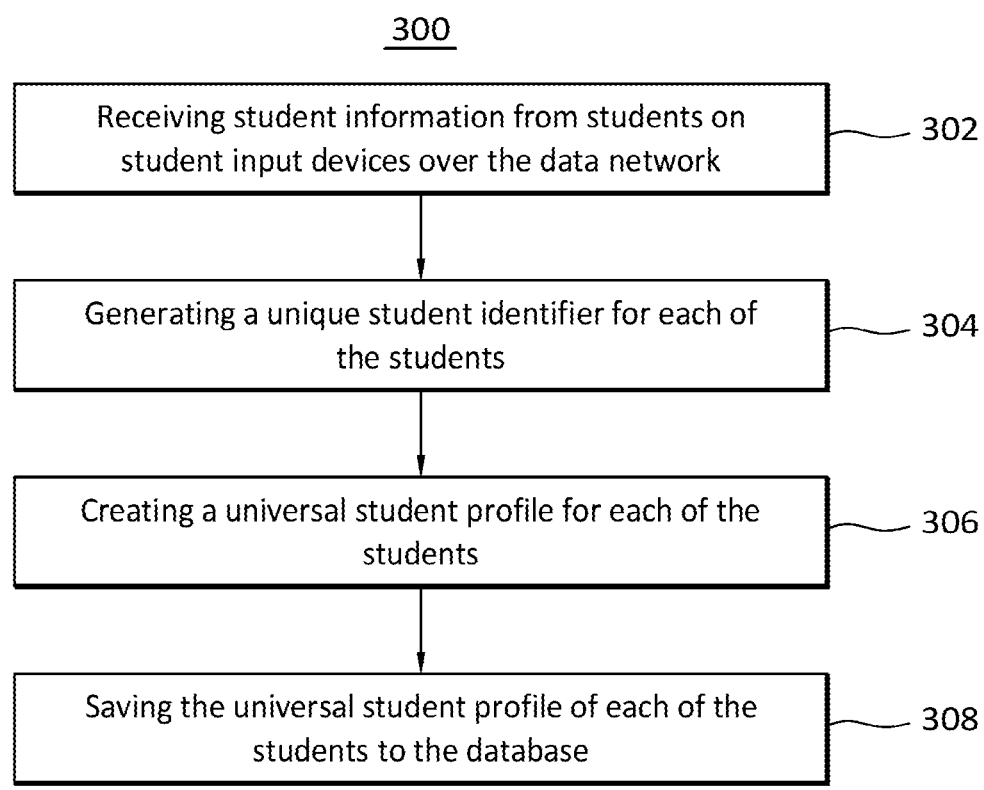
FIG. 3 is a flow chart of a method for onboarding students onto the system for administration of admission offers from educational institutions according to the embodiments disclosed herein.

FIG. 3 is a flow chart of a method 300 for onboarding students onto the system 100 for administration of admission offers from educational institutions according to the embodiments disclosed herein.

The method 300 begins, in step 302, with the administrative server 102 receiving student information from students over the data network. The students providing the student information from one or more of the plurality of student input devices 108 connected to the data network 114.

The student information received from each of the students including student identity information and student qualification information.

The student identity information including a student's identification information. The student qualification information including information relevant to the entrance requirements information for the plurality of educational institutions.

The method 300 continues, in step 304, with the administrative server 102 generating a unique student identifier for each of the students.

The method 300 continues, in step 306, with the administrative server 102 creating a universal student profile 216 for each of the students. Each of the universal student profiles 216 created according to the student schema 202 that provides for a unique student identifier portion 210, a student identity portion 212, and a student qualifications portion 214.

The unique student identifier generated for each of the students is stored within the unique student identifier portion 210 of a corresponding universal student profile 216.

Similarly, the student identification information received from each of the students is stored within the student identity portion 212 of the corresponding universal student profile 216.

Lastly, the student qualification information received from each of the students is stored within the student qualifications portion 214 of the corresponding universal student profile 216.

The method 300 ends, in step 308, with the administrative server 102 saving the universal student profiles of each of the students to the database 104. The database 104 providing storage and searchable retrieval of the universal student profile 216 of each of the students.

Figure 4:
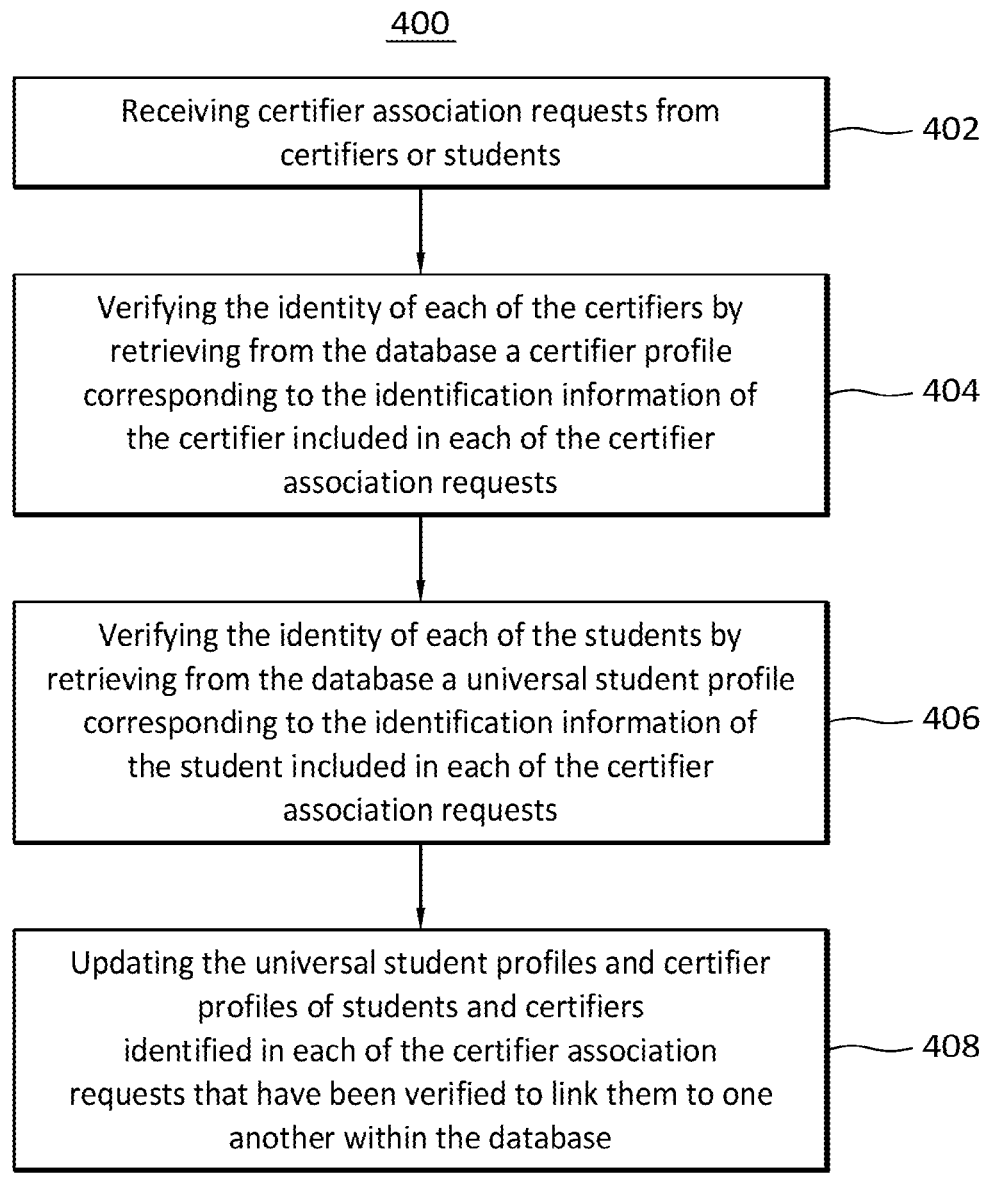
FIG. 4 is a flow chart of a method for associating a universal student profile with a verified certifier in the system for administration of admission offers from educational institutions according to the embodiments disclosed herein.

FIG. 4 is a flow chart of a method 400 for associating a universal student profile 216 with a verified certifier in the system 100 for administration of admission offers from educational institutions according to the embodiments disclosed herein.

The method 400 begins, in step 402, with the administrative server 102 receiving certifier association requests from third-party certifiers or students.

Each certifier association request, whether received from a third-party certifier or a student, including identification information of a certifier and identification information of a student. In making an association between a certifier and student, the certifier is assigned the responsibility of verifying the student information contained with a universal student profile of the student.

The method 400 continues, in step 404, with the administrative server 102 verifying the identity of each of the certifiers by retrieving from the database 104 a certifier profile 228 corresponding to the identification information of the certifier included in each of the certifier association requests.

Specifically, the identity of each of the certifiers may be verified by searching and retrieving from the database 104 those certifier profiles 228 whose certifier detail portion 226 matches the identification information of the certifier included in each of the certifier association requests.

The method 400 continues, in step 406, with the administrative server 102 verifying the identity of each of the students by retrieving from the database 104 a universal student profile 216 corresponding to the identification information of the student included in each of the certifier association requests.

Specifically, the identity of each of the students may be verified by searching and retrieving from the database 104 those universal student profiles 216 whose student identity portion 212 matches the identification information of the student included in each of the certifier association requests.

Once both the certifier and the student identified in a certifier association request have been verified, the method 400 ends, in step 408, with the administrative server 102 updating the universal student profile 216 of the student and the certifier profile 228 of the certifier identified in each of the certifier association requests that have been verified to link them to one another within the database 104.

Figure 5:
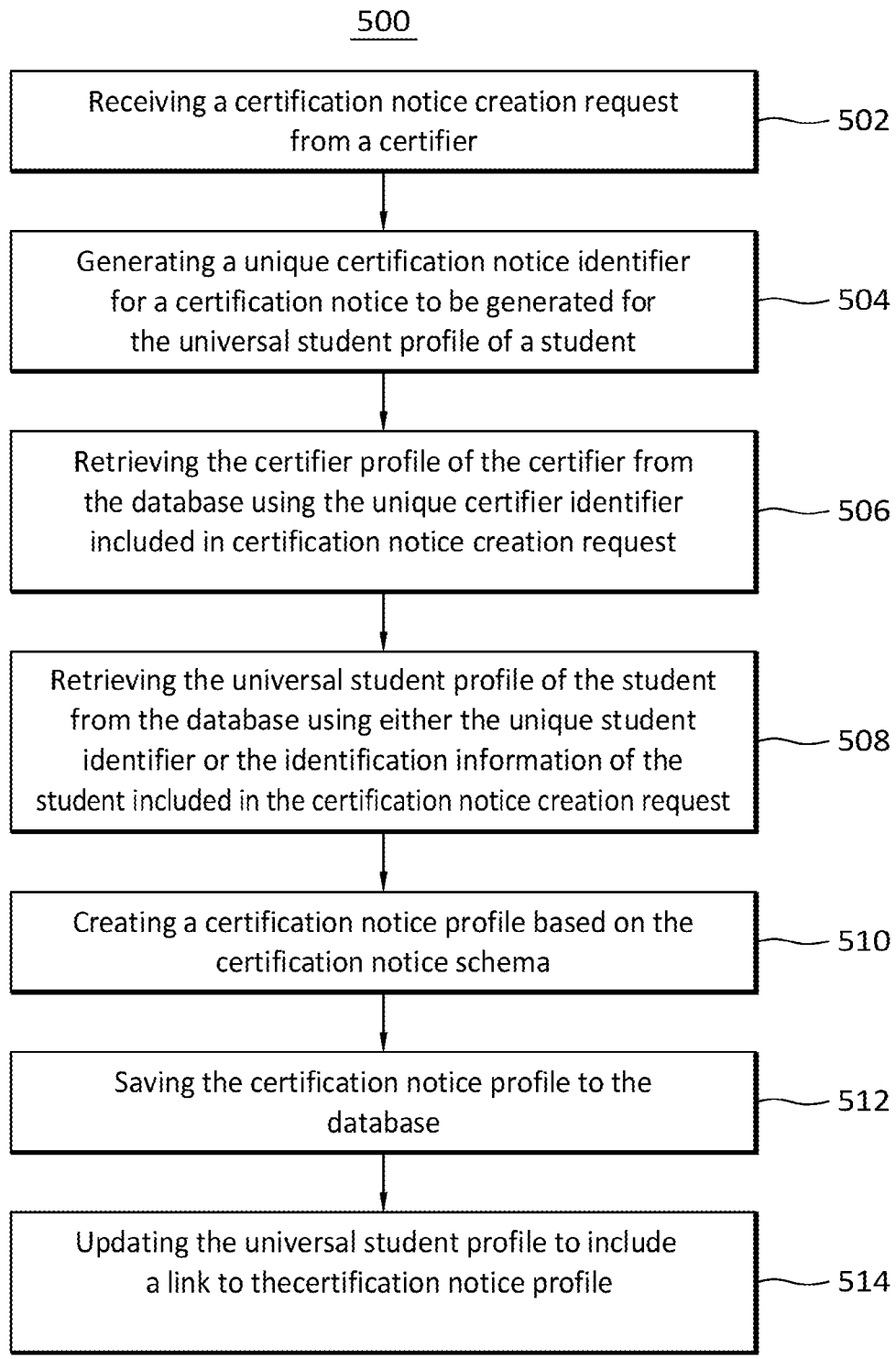
FIG. 5 is a flow chart of a method for the creation of certification notices in the system for administration of admission offers from educational institutions according to the embodiments disclosed herein.

FIG. 5 is a flow chart of a method 500 for the creation of certification notices in the system 100 for administration of admission offers from educational institutions according to the embodiments disclosed herein.

The method 500 begins, in step 502, with the administrative server 102 receiving a certification notice creation request from a certifier. The certification notice creation request including at least a timestamp, a unique certifier identifier, and a unique student identifier or identification information of a student whose universal student profile the certifier is verifying.

The method 500 continues, in step 504, with the administrative server 102 generating a unique certification notice identifier for a certification notice that is to be generated for the universal student profile 216 of the student.

The method 500 continues, in step 506, with the administrative server 102 retrieving the certifier profile 228 of the certifier from the database 104 using the unique certifier identifier included in the certification notice creation request.

The method 500 continues, in step 508, with the administrative server 102 retrieving the universal student profile 216 of the student from the database 104 using either the unique student identifier or the identification information of the student included in the certification notice creation request.

The method 500 continues, in step 510, with the administrative server 102 creating a certification notice profile 234 based on the certification notice schema 208. The unique certification notice identifier portion 230 of the certification notice profile 234 containing the unique certification notice identifier generated for the certification notice.

The certification notice details section of the certification notice details portion 232 containing the timestamp received with the certification notice request.

The certifier details section of the certification notice details portion 232 containing a complete copy of the certifier profile 228 of the certifier as retrieved from the database 104.

The universal student profile detail section of the certification notice details portion 232 containing a copy of an anonymized version of the universal student profile 216 to which the certification notice creation request is directed as retrieved from the database 104.

The method 500 continues, in step 512, with the administrative server 102 saving the certification notice profile 234 to the database 104.

The method 500 ends, in step 514, with the administrative server 102 updating the universal student profile 216 to include a link to the certification notice profile 234.

Figure 6:
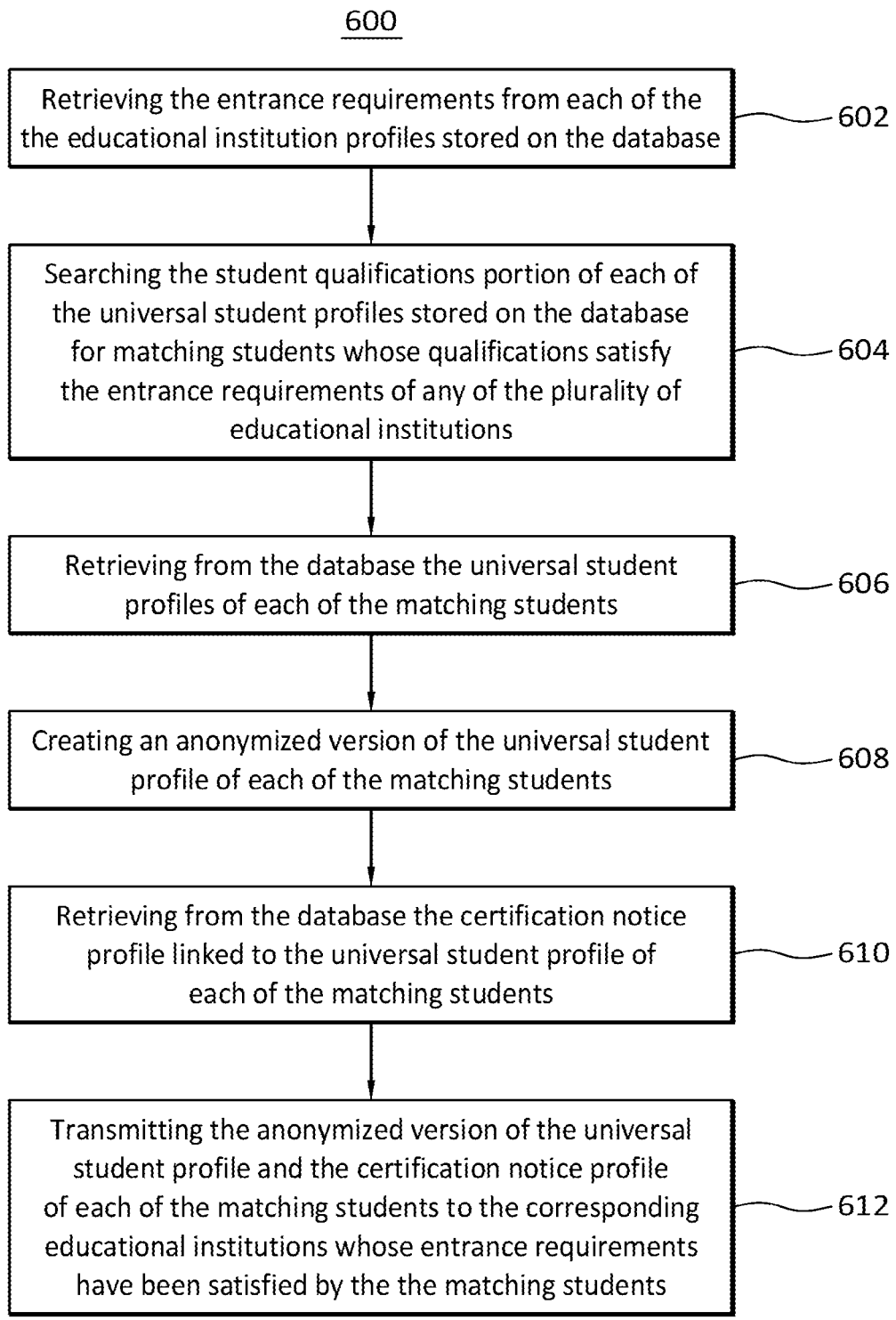
FIG. 6 is a flow chart of a method for matching universal student profiles and educational institution profiles in the system for administration of admission offers from educational institutions according to the embodiments disclosed herein.

FIG. 6 is a flow chart of a method 600 for matching universal student profiles and educational institution profiles in a system 100 for administration of admission offers from educational institutions according to the embodiments disclosed herein.

The method 600 begins, in step 602, with the administrative server 102 retrieving the entrance requirements from each of the educational institution profiles 222 stored on the database 104.

The method 600 continues, in step 604, with the administrative server 102 searching the student qualifications portion 214 of each of the universal student profiles 216 stored on the database 104 for matching students whose qualifications satisfy the entrance requirements of any of the plurality of educational institutions.

A student may be matched with an educational institution when the student's qualifications satisfy all the entrance requirements of an educational institution.

Specifically, a match is made when the desired programs of study, desired start dates, academics, English language proficiency, standardized tests, budget, and source country and region qualifications satisfy an educational institution's available programs of study, available start dates, academics, English language proficiency, standardized tests, annual budget, and desired countries and regions entrance requirements, respectively.

The available programs of study entrance requirement is satisfied when the desired programs of study qualification includes a program of study that directly matches or is related to any of the programs of study identified in the available programs of study entrance requirement.

The start dates entrance requirement is satisfied when the start dates qualification includes a date that approximately matches any of the start dates identified in the available start dates entrance requirement.

The academics entrance requirement is satisfied when the academics qualification includes an academic grade that matches or exceeds any of the academic grades listed in the academics entrance requirement.

The English language proficiency entrance requirement is satisfied when the English language proficiency qualification includes an English language proficiency test score equal to or greater than a minimum test score defined in the English language entrance requirement.

The standardized tests entrance requirement is satisfied when the standardized tests qualification includes a standardized test score equal to or greater than a minimum test score defined for a specific standardized test in the standardized tests entrance requirement.

The budget entrance requirement is satisfied when the budget qualification includes an annual budget equal to or greater than an annual budget defined in the budget entrance requirement.

Lastly, the desired source country or region entrance requirement is satisfied when the source country or region qualification includes a country or region identified in the desired country or region entrance requirement.

An educational institution may waive any of the entrance requirements. If an entrance requirement has been waived by an educational institution, then that specific entrance requirement is automatically satisfied when identifying matching students whose qualifications satisfy the entrance requirements of any of the plurality of educational institutions.

The method 600 continues, in step 606, with the administrative server 102 retrieving from the database 104 the universal student profiles 216 of each of the matching students.

The method 600 continues, in step 608, with the administrative server 102 creating an anonymized version of the universal student profile of each of the matching students. The anonymized version of a universal student profile may be created by removing the student identity portion 212 of the universal student profile 216.

The method 600 continues, in step 610, with the administrative server 102 retrieving from the database 104 the certification notice profile 234 linked to the universal student profile 216 of each of the matching students.

The method 600 ends, in step 612, with the administrative server 102 transmitting the anonymized version of the universal student profile 216 and the certification notice profile 234 of each of the matching students to the corresponding educational institutions whose entrance requirements were satisfied by the matching students.

Figure 7:
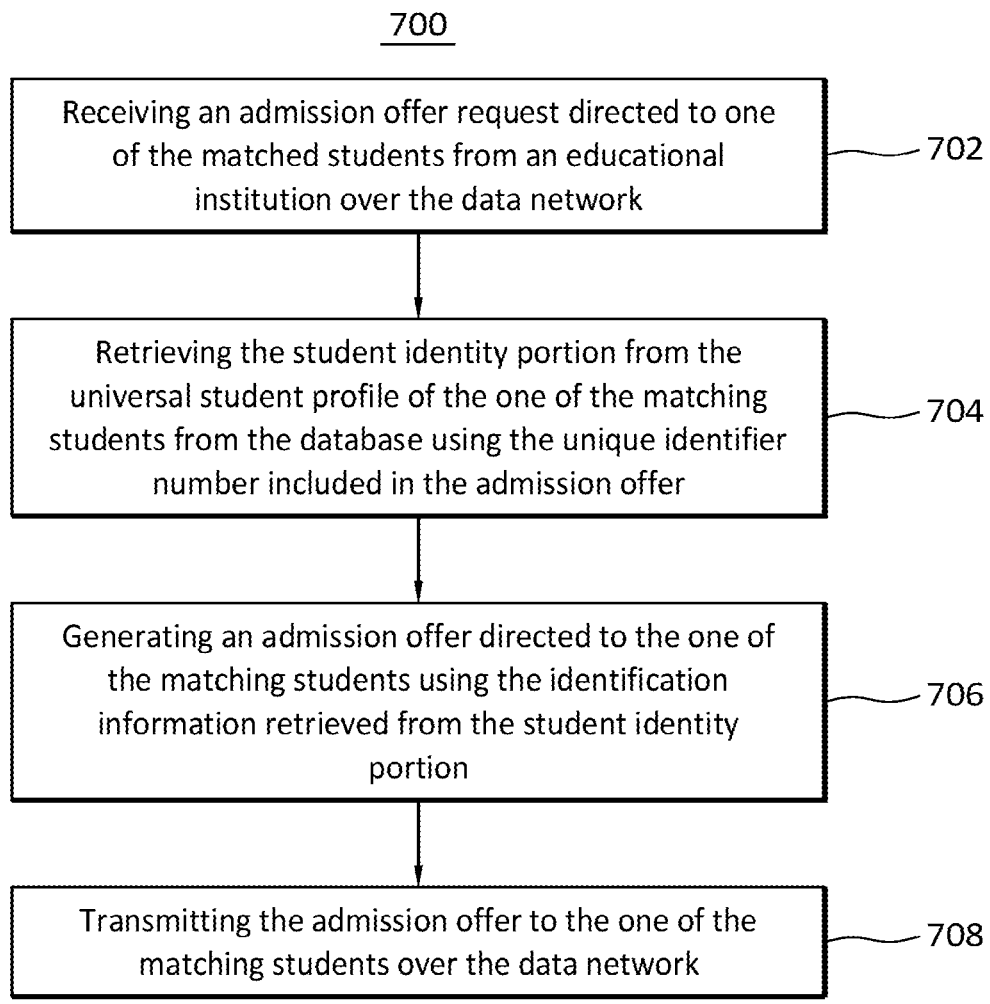
FIG. 7 is a flow chart of a method for generating admission offers in the system for administration of admission offers from educational institutions according to the embodiments disclosed herein.

FIG. 7 is a flow chart of a method 700 for generating admission offers in the system 100 for administration of admission offers from educational institutions according to the embodiments disclosed herein.

The method 700 begins, in step 702, with the administrative server 102 receiving an admission offer request directed to one of the matched students from an educational institution over the data network 114. The admission offer including the unique identifier of the one of the matched students to whom the admission offer is being made.

The method 700 continues, in step 704, with the administrative server 102 retrieving the student identity portion 212 from the universal student profile 216 of the one of the matching students from the database 104 using the unique identifier number included in the admissions offer request.

The method 700 continues, in step 706, with the administrative server 102 generating an admission offer directed to the one of the matching students using the identification information retrieved from the student identity portion 212.

The admission offer may include a name of an educational institution, a timestamp, a start date, and a program of study. The admission offer may further include explanation text, scholarship offer information, and admission offer restrictions relating to any of the entrance requirements.

Lastly, the method 700 ends, in step 708, with the administrative server 102 transmitting the admission offer to the one of the matching students over the data network 114.

The foregoing description discloses only example embodiments. Modifications of the above-disclosed assemblies and methods which fall within the scope of this disclosure will be readily apparent to those of ordinary skill in the art.

This disclosure is not intended to limit the invention to the particular assemblies and/or methods disclosed, but, to the contrary, the intention is to cover all modifications, equivalents, and alternatives falling within the scope of the claims.

We claim:

1. A computer-implemented method for facilitating a reverse-entry process, comprising:
    obtaining a centralized first database of user profiles;
    obtaining a second database of entity profiles corresponding to a plurality of distributed entities, each entity profile in the second database corresponding to a respective entity and including a respective entry criteria;
    comparing the first database and the second database to identify one or more matches between a respective entity profile in the second database and a respective user profile in the first database that satisfies the entry criteria of the respective entity profile;
    for each match of the one or more matches:
        generating a respective anonymized universal user profile that excludes identifying information from the respective user profile; and
        transmitting the respective anonymized universal user profile to a respective entity device associated with the matching entity profile;
    receiving at least one reverse-entry request from the respective entity devices, each reverse-entry request comprising at least one admission request identifying at least one of the respective anonymized universal user profiles and the respective entity sending the reverse-entry request;
    for each reverse-entry request:
        de-anonymizing the reverse-entry request by linking the reverse-entry request to a further user profile in the first database that is associated with the respective anonymized universal user profile identified in the reverse-entry request;
        generating a respective reverse-entry notification based on the respective entity identified in the reverse-entry request and the further user profile; and
        transmitting the respective reverse-entry notification to a user device corresponding to the further user profile.

2. The computer-implemented method of claim 1, further comprising:
    receiving information from one or more users, the information including qualification information and entry preferences; and
    generating one or more user profiles based on the received information.

3. The computer-implemented method of claim 1, wherein each user profile of the user profiles include a respective certification notice.

4. The computer-implemented method of claim 3, further comprising:
    obtaining the respective certification notice by:
        assigning the user profile to a respective certifier;
        receiving, from a respective certifier device associated with the respective certifier, the respective certification notice.

5. The computer-implemented method of claim 4, further comprising:
    in response to receiving the respective certification notice, verifying an identification of the certifier based on a database of certifier information.

6. The computer-implemented method of claim 1, wherein the at least one reverse-entry request is received from the respective entity devices without identification of the respective entities by users and without initiation of communication from the users.

7. A system for facilitating a reverse-entry process, comprising:
    at least one memory storing:
        instructions;
        a centralized first database of user profiles; and
        a second database of entity profiles corresponding to a plurality of distributed entities, each entity profile in the second database corresponding to a respective entity and including a respective entry criteria; and
    at least one processor operatively connected to the memory and configured to execute the instructions to perform operations, including:
        comparing the first database and the second database to identify one or more matches between a respective entity profile in the second database and a respective user profile in the first database that satisfies the entry criteria of the respective entity profile;

for each match of the one or more matches:
generating a respective anonymized universal user profile that excludes identifying information from the respective user profile; and
transmitting the respective anonymized universal user profile to a respective entity device associated with the matching entity profile;

receiving at least one reverse-entry request from the respective entity devices, each reverse-entry request comprising at least one admission request identifying at least one of the respective anonymized universal user profiles and the respective entity sending the reverse-entry request;

for each reverse-entry request:
de-anonymizing the reverse-entry request by linking the reverse-entry request to a further user profile in the first database that is associated with the respective anonymized universal user profile identified in the reverse-entry request;
generating a respective reverse-entry notification based on the respective entity identified in the reverse-entry request and the further user profile; and
transmitting the respective reverse-entry notification to a user device corresponding to the further user profile.

8. The system of claim 7, wherein the operations further include:
receiving information from one or more users, the information including qualification information and entry preferences; and
generating one or more user profiles based on the received information.

9. The system of claim 7, wherein each user profile of the user profiles include a respective certification notice.

10. The system of claim 9, wherein the operations further include:
obtaining the respective certification notice by:
assigning the user profile to a respective certifier;
receiving, from a respective certifier device associated with the respective certifier, the respective certification notice.

11. The system of claim 10, wherein the operations further include:
in response to receiving the respective certification notice, verifying an identification of the certifier based on a database of certifier information.

12. The system of claim 7, wherein the at least one reverse-entry request is received from the respective entity devices without identification of the respective entities by users and without initiation of communication from the users.

13. A non-transitory computer-readable medium comprising instructions executable by at least one processor to perform operations for facilitating a reverse-entry process, the operations including:

obtaining a centralized first database of user profiles;
obtaining a second database of entity profiles corresponding to a plurality of distributed entities, each entity profile in the second database corresponding to a respective entity and including a respective entry criteria;
comparing the first database and the second database to identify one or more matches between a respective entity profile in the second database and a respective user profile in the first database that satisfies the entry criteria of the respective entity profile;
for each match of the one or more matches:
generating a respective anonymized universal user profile that excludes identifying information from the respective user profile; and
transmitting the respective anonymized universal user profile to a respective entity device associated with the matching entity profile;
receiving at least one reverse-entry request from the respective entity devices, each reverse-entry request comprising at least one admission request identifying at least one of the respective anonymized universal user profiles and the respective entity sending the reverse-entry request;
for each reverse-entry request:
de-anonymizing the reverse-entry request by linking the reverse-entry request to a further user profile in the first database that is associated with the respective anonymized universal user profile identified in the reverse-entry request;
generating a respective reverse-entry notification based on the respective entity identified in the reverse-entry request and the further user profile; and
transmitting the respective reverse-entry notification to a user device corresponding to the further user profile.

14. The non-transitory computer-readable medium of claim 13, wherein the operations further include:
receiving information from one or more users, the information including qualification information and entry preferences; and
generating one or more user profiles based on the received information.

15. The non-transitory computer-readable medium of claim 13, wherein each user profile of the user profiles include a respective certification notice.

16. The non-transitory computer-readable medium of claim 15, wherein the operations further include:
obtaining the respective certification notice by:
assigning the user profile to a respective certifier;
receiving, from a respective certifier device associated with the respective certifier, the respective certification notice.

17. The non-transitory computer-readable medium of claim 16, wherein the operations further include:
in response to receiving the respective certification notice, verifying an identification of the certifier based on a database of certifier information.

* * * * *